2,870,189
BIS-PHOSPHOROAMIDOTHIOATES

Etcyl H. Blair, Harold R. Slagh, and Edgar C. Britton, Midland, Mich., assignors to The Dow Chemical Company, Midland, Mich., a corporation of Delaware No Drawing. Application October 5, 1956
Serial No. 614,057

6 Claims. (Cl. 260—461)

This invention relates to the bis-phosphoroamidothioates having the formula

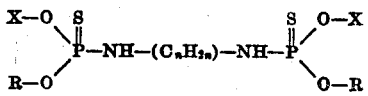

In this and succeeding formulas, R represents lower alkyl, X represents haloaryl and $n$ represents one of the integers 2 and 3. The expression "lower alkyl" as herein employed refers to the alkyl radicals containing from 1 to 4 carbon atoms, inclusive. The new bis-phosphoroamidothioates are viscous liquids or crystalline solids somewhat soluble in many organic solvents and of very low solubility in water. They are useful as parasiticides and are adapted to be employed as active toxic constituents of compositions for the control of root-knot nematodes and many mite and insect organisms such as aphids and flies.

The new compounds may be prepared by reacting an O-haloaryl O-lower alkyl phosphorochloridothioate having the formula

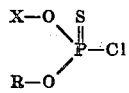

with ethylene diamine or propylene diamine to displace one of the amino hydrogen atoms in each amino group of the diamine with phosphoryl groups. The reaction is somewhat exothermic and takes place smoothly at the temperature range of from $-10°$ C. to $50°$ C. with the formation of the desired product and hydrogen chloride of reaction. The temperature may be controlled by regulating the rate of contacting the reactants and by external cooling. The reaction is carried out in an inert organic solvent such as benzene, toluene, methylene chloride or acetone and in the presence of a neutralizing agent for by-product hydrogen chloride such as excess diamine, an alkali metal hydroxide or an alkali metal salt. Good results are obtained when employing at least two molecular proportions of the phosphorochloridothioate with each molecular proportion of diamine and an amount of neutralizing agent sufficient to neutralize by-product hydrogen chloride. When employing the diamine as neutralizing agent, at least twice the proportion of diamine as recited above is employed to provide excess diamine to act as hydrogen chloride acceptor. With a neutralizing agent such as sodium hydroxide or sodium carbonate, the agent is employed in an amount about equimolar with the amount of phosphorochloridothioate reactant. Upon completion of the reaction, the desired product is separated in conventional fashion.

In carrying out the reaction, the diamine or a solution thereof in the reaction solvent is added portionwise with stirring to the phosphorochloridothioate dispersed in the same solvent at a temperature of from $-10°$ to $50°$ C. In an alternative procedure, the phosphorochloridothioate is added portionwise to the diamine dispersed in the reaction solvent. In either event, an excess of diamine may be employed to act as hydrogen chloride acceptor. When an alkali metal hydroxide or alkali metal salt is employed as the neutralizing agent, the agent is added portionwise to the reaction zone during the contacting of the diamine and phosphorochloridothioate. Upon completion of the reaction, the reaction mixture is washed with water and any reaction solvent removed by evaporation or fractional distillation under reduced pressure to obtain the desired phosphoroamidothioate product as a liquid or solid residue.

The following examples illustrate the invention but are not to be construed as limiting:

*Example 1.—O,O',-bis(2,4,5-trichlorophenyl) O,O'-dimethyl N,N'-ethylenebisphosphoroamidothioate*

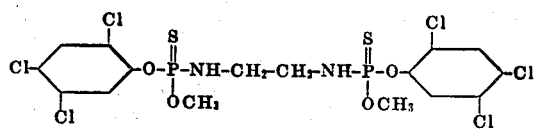

A solution of ethylenediamine (0.6 mole, 36 grams) in 200 milliliters of methylene chloride was added portionwise with stirring to a solution of 81.5 grams (0.25 mole) of O-2,4,5-trichlorophenyl) O-methyl phosphorochloridothioate in 300 milliliters of methylene chloride. The addition was carried out in one hour and at a temperature of $5°$ C. After the addition, the mixture was stirred for one hour while allowing it to warm to room temperature. The reaction mixture was then washed with water and the methylene chloride removed by distillation under reduced pressure. As a result of these operations, an O,O'-bis(2,4,5-trichlorophenyl) O,O'-dimethyl N,N'-ethylenebisphosphoroamidothioate product was obtained as a white crystalline solid which after two recrystallizations from isopropyl alcohol was found to melt at $118°–123°$ C. This product contained 33.3 percent chlorine and 9.92 percent sulfur compared to the calculated values of 33.2 percent and 10.0 percent, respectively.

*Example 2.—O,O' - bis(4 - chlorophenyl) O,O'-dimethyl N,N'-ethylenebisphosphoroamidothioate*

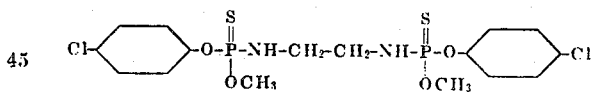

Ethylenediamine (4.5 grams, 0.075 mole) was added portionwise with stirring to a solution of 19.2 grams (0.075 mole) of O-(4-chlorophenyl) O-methyl phosphorochloridothioate in 65 milliliters of acetone. The addition was carried out in 30 minutes and at a temperature of from $6°$ to $12°$ C. A solution of 3 grams of sodium hydroxide in 15 milliliters of water was then added in 15 minutes and at a temperature of from $8°$ to $14°$ C. This was followed by the addition of 19.2 grams (0.075 mole) of O-(4-chlorophenyl) O-methyl phosphorochloridothioate in 15 minutes and at a temperature of from $8°$ to $14°$ C. An additional 3 grams of sodium hydroxide in 15 milliliters of water was finally added at a temperature of from $6°$ to $12°$ C. and the resulting mixture heated for 3 hours at a temperature of from $20°$ to $30°$ C. The solvent was then removed from the reaction mixture by evaporation, the residue taken up in methylene chloride and the methylene chloride solution washed with water. Upon removal of the methylene chloride there was obtained an O,O'-bis(4-chlorophenyl) O,O'-dimethyl N,N'-ethylenebisphosphoroamidothioate product as a liquid residue having a refractive index $n/D$ of 1.5844 at $25°$ C. This product contained 13.8 percent chlorine and 12.96 percent sulfur compared to the theoretical values of 14.13 percent chlorine and 12.75 percent sulfur.

*Example 3.—O,O'-bis(2,4-dichlorophenyl) O,O'-dimethyl N,N'-ethylenebisphosphoroamidothioate*

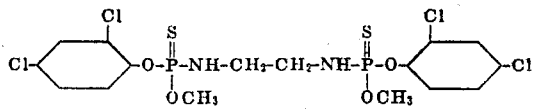

Six grams (0.1 mole) of ethylenediamine was added gradually with stirring to a solution of 27.2 grams (0.1 mole) of O-(2,4-dichlorophenyl) O-methyl phosphorochloridothioate in 50 milliliters of acetone. The addition was carried out over a period of 30 minutes and at a temperature of from 4° to 12° C. A solution of 4 grams of sodium hydroxide in 20 milliliters of water was then added over a period of 15 minutes and at a temperature of from 8° to 12° C. An additional 27.2 grams (0.1 mole) of O-(2,4-dichlorophenyl) O-methyl phosphorochloridothioate was finally added in 20 minutes at a temperature of from 9° to 14° C. followed by the addition of a solution of 4 grams of sodium hydroxide in 20 milliliters of water over a period of 15 minutes and at a temperature of from 8° to 13° C. The resulting mixture was then heated at room temperature for 3 hours and thereafter processed as described in Example 2 to obtain an O,O'-bis(2,4-dichlorophenyl) O,O'-dimethyl N,N'-ethylenebisphosphoroamidothioate product as a liquid residue having a refractive index n/D of 1.5918 at 25° C. and a specific gravity of 1.4864 at 25° C.

*Example 4.—O,O'-bis(2,4,5-trichlorophenyl) O,O'-diethyl N,N'-propylenebisphosphoroamidothioate*

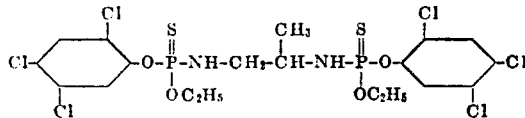

1,2-diaminopropane (7.4 grams, 0.1 mole) was added gradually with stirring to a solution of 34 grams (0.1 mole) of O-(2,4,5-trichlorophenyl) O-ethyl phosphorochloridothioate in 50 milliliters of acetone. The addition was carried out over a period of 30 minutes and at a temperature of 10° C. Following the addition, stirring was continued for 30 minutes before adding a solution of 4 grams of sodium hydroxide in 15 milliliters of water. The sodium hydroxide solution was added in 15 minutes at room temperature. The reaction mixture was then cooled to 10° C. and another 34 grams (0.1 mole) of O-(2,4,5-trichlorophenyl) O-ethyl phosphorochloridothioate added gradually over a period of 30 minutes. The resulting mixture was stirred at room temperature for one hour before adding a solution of 10.6 grams of sodium carbonate dissolved in 30 milliliters of water. Stirring was thereafter continued at room temperature for 1.5 hours and the reaction mixture thereafter processed as described in Example 2 to obtain an O,O'-bis(2,4,5-trichlorophenyl) O,O'-diethyl N,N'-propylenebisphosphoroamidothioate product as a yellow, viscous liquid having a refractive index n/D of 1.4200 at 25° C. and a sulfur content of 9.32 percent compared to the theoretical value of 9.39 percent.

*Example 5.—O,O'-bis(2-bromo-4-tertiarybutylphenyl) O,O'-dimethyl N,N'-ethylenebisphosphoroamidothioate*

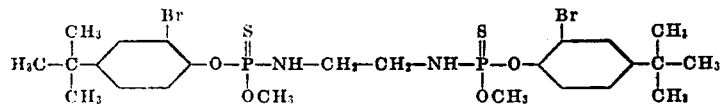

An amount of ethylenediamine in excess of 0.15 mole was added portionwise to a solution of 0.1 mole of O-(2-bromo-4-tertiarybutylphenyl) O-methyl phosphorochloridothioate in 150 milliliters of methylene chloride. The addition was carried out over a period of 30 minutes and at a temperature of from 5° to 15° C. Following the addition, the reaction mixture was washed thoroughly with water and the solvent removed under reduced pressure. The desired phosphoroamidothioate product was obtained as a red liquid residue. O,O'-bis(2-bromo-4-tertiarybutylphenyl) O,O'-dimethyl N,N'-ethylenebisphosphoroamidothioate has a molecular weight of 702.

In a similar manner other phosphoroamidothioates may be prepared of which the following are representative:

O,O'-bis(4-bromophenyl) O,O'-ditertiarybutyl N,N'-ethylenebisphosphoroamidothioate by the reaction of ethylenediamine and O-(4-bromophenyl) O-tertiarybutyl phosphorochloridothioate.

O,O'-bis(3,4-dichlorophenyl) O,O'-diethyl N,N'-propylenebisphosphoroamidothioate by the reaction of 1,2-diaminopropane and O-(3,4-dichlorophenyl) O-ethyl phosphorochloridothioate.

O,O'-bis(2-bromo-4-chlorophenyl) O,O'-dimethyl N,N'-ethylenebisphosphoroamidothioate by the reaction of ethylene diamine with O-(2-bromo-4-chlorophenyl) O-methyl phosphorochloridothioate.

O,O'-bis(4-tertiarybutyl-2-chlorophenyl) O,O'-dimethyl N,N'-trimethylenebisphosphoroamidothioate by the reaction of 1,3-diaminopropane and O-(4-tertiarybutyl-2-chlorophenyl) O-methyl phosphorochloridothioate.

O,O'-bis(4-methyl-2-chlorophenyl) O,O'-diisopropyl N,N'-ethylenebisphosphoroamidothioate by the reaction of ethylene diamine and O-(4-methyl-2-chlorophenyl) O-isopropyl phosphorochloridothioate.

O,O'-bis(2,4,5-tribromophenyl) O,O'-diethyl N,N'-propylenebisphosphoroamidothioate by the reaction of 1,2-diaminopropane and O-(2,4,5-tribromophenyl) O-ethyl phosphorochloridothioate.

O,O'-bis(2,3,4,5-tetrachlorophenyl) O,O'-ditertiarybutyl N,N'-trimethylenebisphosphoroamidothioate by the reaction of 1,3-diaminopropane and O-(2,3,4,5-tetrachlorophenyl) O-tertiarybutyl phosphorochloridothioate.

The new bis-phosphoroamidothioates of the present invention are effective as parasiticides and are adapted to be employed for the control of nematodes as well as many other household and agricultural pests. For such use the products may be dispersed on a finely divided carrier and employed as dusts. The new products may also be employed in oils, as constituents in water emulsions or in water dispersions. In representative operations, 100 percent controls of root-knot nematodes have been obtained with aqueous compositions containing 10 parts by weight of O,O'-bis(2,4,5-trichlorophenyl) O,O'-dimethyl N,N'-ethylenebisphosphoroamidothioate per million parts of ultimate mixture.

The O-haloaryl O-lower alkyl phosphorochloridothioates employed as starting materials in the present invention may be prepared by reacting from 2 to 3 molecular proportions of a lower alkanol with one molecular proportion of an O-haloaryl phosphorodichloridothiate at a temperature at which hydrogen chloride is formed as a product of reaction while continuously withdrawing hydrogen chloride in the gaseous state from the reaction mixture as formed, said temperature being at least 15 centigrade degrees below the boiling point at 760 millimeters pressure of the employed alkanol. In carrying out the reaction, the alkanol may be added portionwise to the O-haloaryl phosphorodichloridothioate reagent at a temperature of 40° to 50° C. and under conditions of reduced pressure in the reaction mixture. Following the reaction, the reaction mixture is partially distilled under reduced pressure to remove low boiling constituents and obtain the desired product as a crystalline or liquid residue.

We claim:
1. A phosphoroamidothioate having the formula

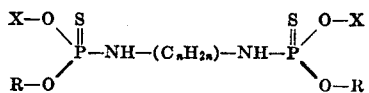

in which R represents lower alkyl, X represents a member of the group consisting of the halophenyl and 2-halo-4-loweralkylphenyl radicals and $n$ represents one of the integers 2 and 3, said halogen being selected from the group consisting of chlorine and bromine.

2. O,O' - bis(2,4,5 - trichlorophenyl) O,O' - dimethyl N,N'-ethylenebisphosphoroamidothioate.
3. O,O'-bis(2,4-dichlorophenyl) O,O'-dimethyl N,N'-ethylenebisphosphoroamidothioate.
4. O,O'-bis(2,4,5-trichlorophenyl) O,O'-diethyl N,N'-propylenebisphosphoroamidothioate.
5. O,O' - bis(2 - bromo-4-tertiarybutylphenyl) O,O'-dimethyl N,N'-ethylenebisphosphoroamidothioate.
6. O,O'-bis(4-chlorophenyl) O,O'-dimethyl N,N'-ethylenebisphosphoroamidothioate.

No references cited.